(12) United States Patent
Tran (10) Patent No.: US 7,639,163 B2
(45) Date of Patent: Dec. 29, 2009

(54) METHOD AND APPARATUS FOR DISPLAYING ROUTE GUIDANCE LIST FOR NAVIGATION SYSTEM

(75) Inventor: Thai Tran, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 322 days.

(21) Appl. No.: 11/732,545

(22) Filed: Apr. 4, 2007

(65) Prior Publication Data

US 2008/0249708 A1 Oct. 9, 2008

(51) Int. Cl.
*G08G 1/123* (2006.01)
(52) U.S. Cl. .............................. 340/995.19; 340/995.2; 340/995.27
(58) Field of Classification Search ................. 340/988, 340/995.1, 995.14, 995.15, 995.16, 995.23, 340/995.27, 995.19, 995.2, 995.21; 701/200, 701/201, 202, 208, 209
See application file for complete search history.

(56) References Cited

U.S. PATENT DOCUMENTS

| | | | | |
|---|---|---|---|---|
| 6,278,940 | B1 | 8/2001 | Endo | |
| 6,732,047 | B1 * | 5/2004 | de Silva | 701/209 |
| 6,859,723 | B2 * | 2/2005 | Yokota | 701/201 |
| 6,876,921 | B2 * | 4/2005 | Omi | 701/207 |
| 6,970,783 | B2 * | 11/2005 | Knockeart et al. | 701/201 |
| 7,171,304 | B2 * | 1/2007 | Wako | 701/200 |
| 7,406,665 | B2 * | 7/2008 | Yokota | 701/209 |

* cited by examiner

*Primary Examiner*—Van T. Trieu
(74) *Attorney, Agent, or Firm*—Muramatsu & Associates (57) ABSTRACT

A method and apparatus for a navigation system displays a route guidance list that lists information on roads that intersect with a calculated route to the destination in an organized and simplified manner. The method includes the steps of calculating a route to a destination specified by a user, retrieving information on intersecting roads that intersect with the calculated route; and displaying a route guidance list which lists road names on which the calculated route is established and a distance associated with the intersecting road. The route guidance list shows one integrated road name if there are two or more identical road names consecutively on the calculated route and an overall distance of the identical road names that intersect with the calculated route.

20 Claims, 7 Drawing Sheets

METHOD AND APPARATUS FOR DISPLAYING ROUTE GUIDANCE LIST FOR NAVIGATION SYSTEM

FIELD OF THE INVENTION

This invention relates generally to a display method and apparatus for a navigation system, and particularly, to a method and apparatus for displaying a route guidance list that lists information on waypoints and intersections on a calculated route to the destination in an organized and simplified manner so that a user can understand the information at a glance of the route guidance list.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen to guide the user to a destination.

Figure 1A:
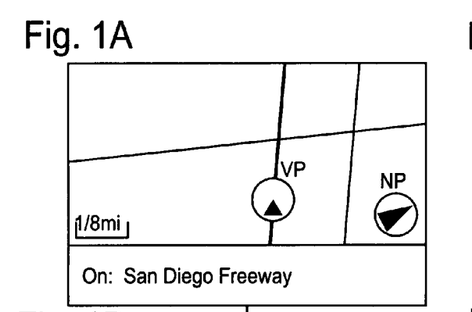
FIGS. 1A-1H are schematic diagrams showing an example of operational process and screen display involved in the navigation system for selecting a destination and travelling to the destination under the route guidance.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

Figure 1B:
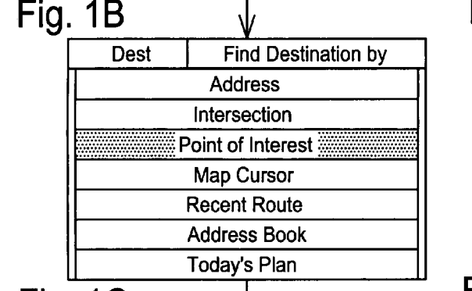

An example of process for specifying a destination in the navigation system through a Point of Interest (POI) search method is shown in FIG. 1B-1F. When a user selects to set a destination, the navigation system displays a "Find Destination by" screen as shown in FIG. 1B for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

Figure 1C:
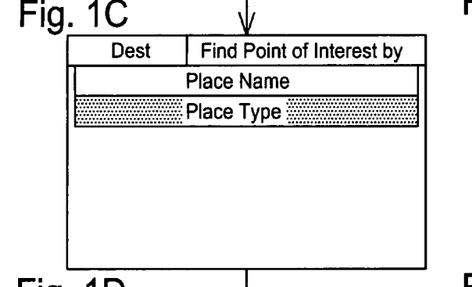

When selecting, the "Point of Interest" method in FIG. 1B, the navigation system displays selection methods of point of interest (POI) either by "Place Name" or "Place Type" in FIG. 1C. The "Place Name" is to specify a name of the intended POI, and the "Place Type" is to specify a category of the intended POI. If the "Place Type" is selected in FIG. 1C, the navigation system lists categories of POIs as shown in FIG. 1D.

Figure 1D:
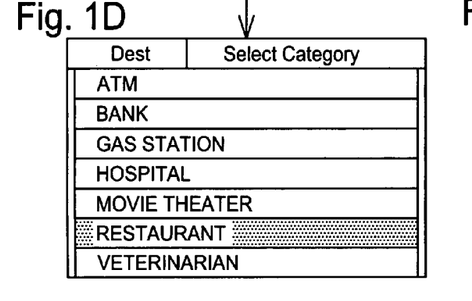
Figure 1E:
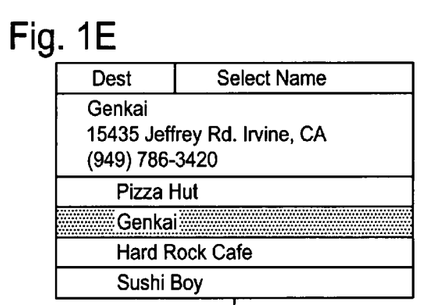

FIG. 1E shows a screen when the user has selected a "Restaurant" category in the example of FIG. 1D. In this example, the screen includes a list of names of the restaurants typically sorted by distance from the current position. The user selects a particular restaurant among the restaurants in the list.

Figure 1F:
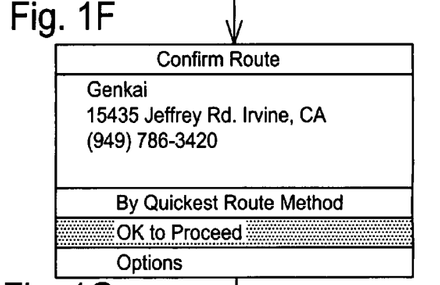
Figure 1G:
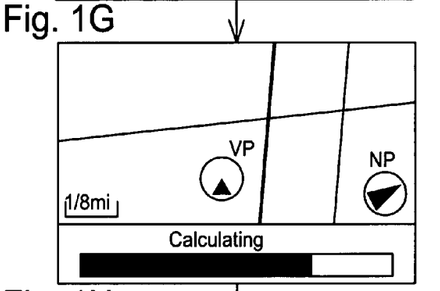
Figure 1H:
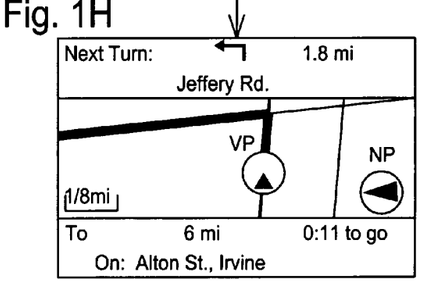

As the user selects a desired destination, as shown in FIG. 1F, and may press an "OK to Proceed" button for the navigation system to calculate an appropriate route to the destination. FIG. 1G shows an example of screen during which the navigation system calculates and determines the route to the destination. After determining the route, the navigation system starts the route guidance to the destination as shown in FIG. 1H.

Figure 2:
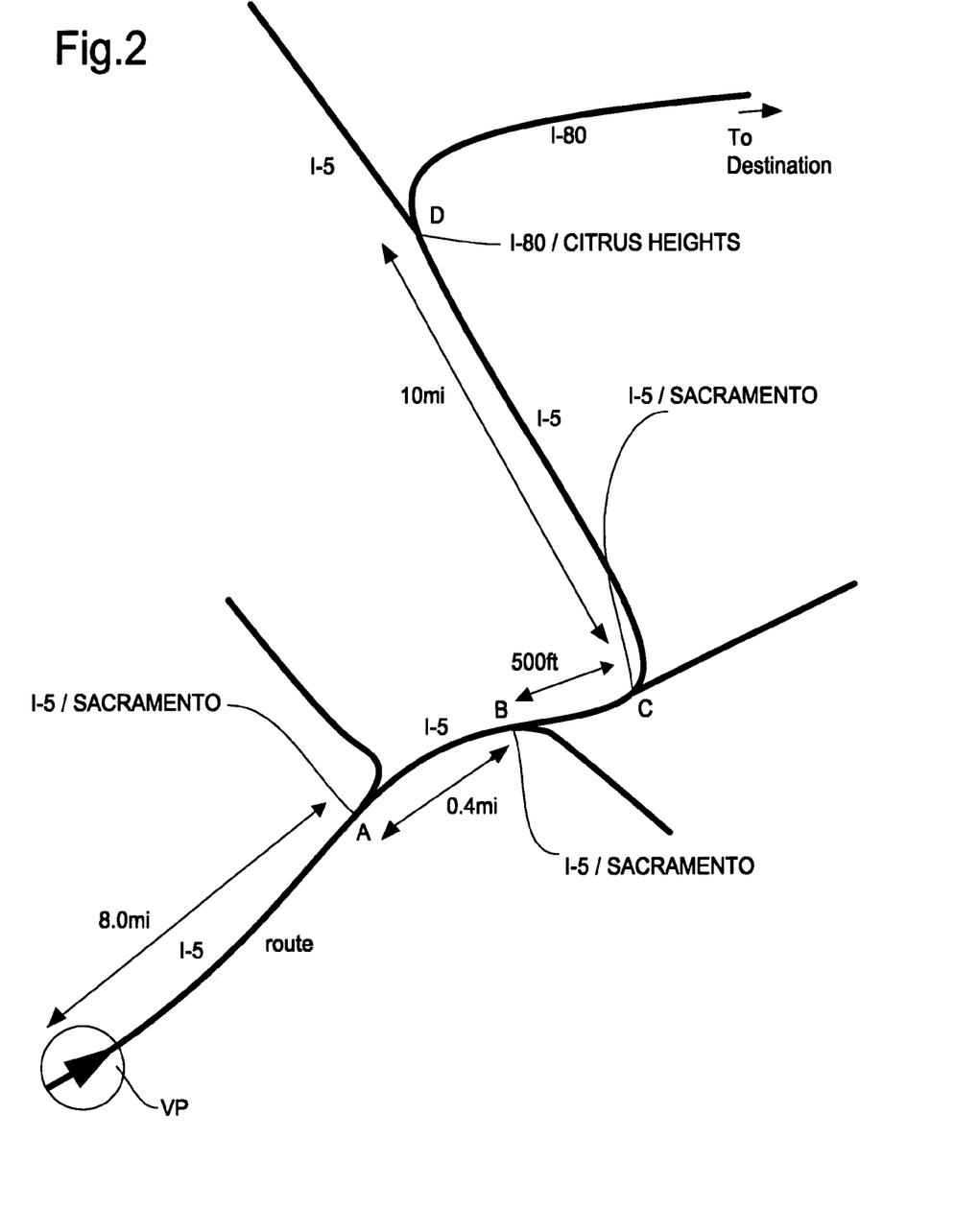
FIG. 2 is a schematic view showing a map image that includes a calculated route toward a destination to illustrate an example of situation that arises during the route guidance in the conventional navigation system.

FIG. 2 is a schematic view showing a map image including the calculated route to illustrate an example of situation that can arise during the route guidance in the conventional navigation system. The map image in FIG. 2 is mainly composed of interstate highways I-5 and I-80 where the destination is away on the highway I-80. The interstate highway I-5 have several points (waypoints which are typically intersections) that branch off to other roads (intersecting roads).

From the left, after 8.0 miles from the current vehicle position VP, the interstate highway I-5 intersects a road (intersecting road) that branches off at a point A. Similarly, at the 0.4 miles from the last branching off (point A), another intersecting road branches off from the interstate highway I-5 at a point B. Similarly, after 500 feet from the last branching off (point B), another intersecting road branches off from the interstate highway I-5 at a point C. At a point D, the calculated route takes the interstate highway I-80 toward the destination. As will be explained later, the situation of FIG. 2 can cause confusion when a route guidance list is displayed on the conventional navigation system.

Figure 3:
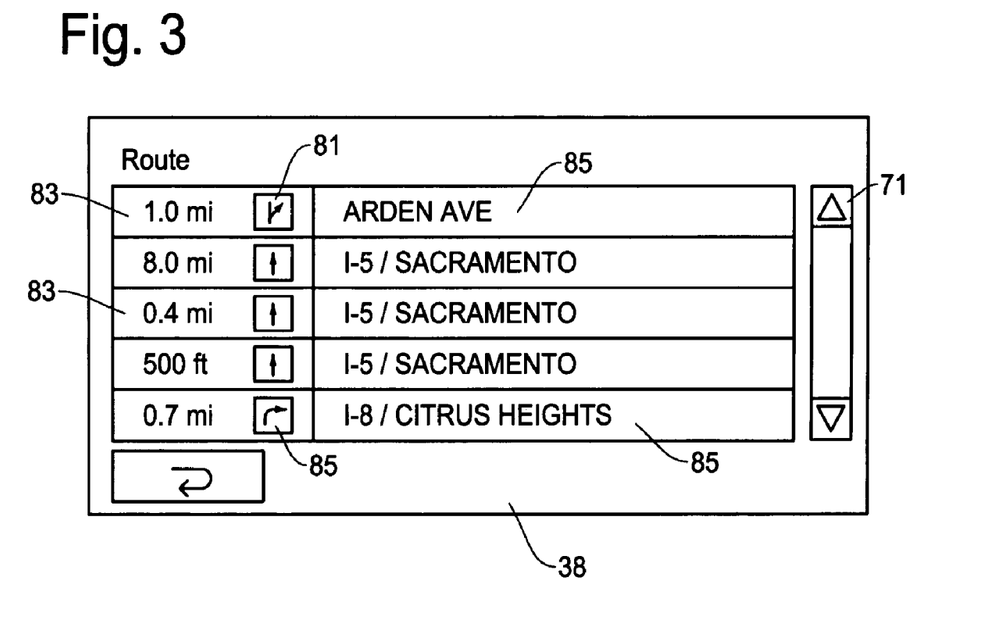
FIG. 3 is a display example of a route guidance list which lists road names associated with the calculated route to guide to user to the destination where the route guidance list reflects the situation shown in FIG. 2.

FIG. 3 is a display example of a route guidance list which lists intersections (road names) and maneuver directions on the calculated route. The route guidance list of FIG. 3 reflects the situation of FIG. 2 which lists a plurality of entries. In the example of FIG. 3, each entry has a distance indicator 83, a maneuver icon 81, and a road (street) name indicator 85.

The distance indicator 83 shows the distance on the calculated route between the two roads that intersect with the calculated route indicated by the road name indicator 85. The distance can also be a length between the current vehicle position and the next road that intersects with the calculated route. The maneuver icon 81 provides information about maneuvering operation or direction, such as going straight, making a left turn, branching off to the right, etc. Thus, for the street "Arden Avenue" at the top of the list, the navigation system indicates there is a road named "Arden Avenue" that intersects with the calculated route at the driving distance of 1.0 miles which branches off to the right. A scroll key 71 allows the user to scroll the route guidance list to see more entries in the list.

As shown in the display example of FIG. 3, the three road name indicators 85 for the middle of the list show "I-5/SACRAMENTO", i.e., the same road name. This occurs due to the geographical feature of the calculated route in the case of FIG. 2. Namely, as shown in FIG. 2, in the case where a road is comprised of a plurality of segments, the navigation system may recognize the road as a plurality of roads as opposed to one road.

This would cause confusion to the driver since the logical interpretation of this situation to the user is to remain on interstate highway I-5 rather than to the highway "I-5/SACRAMENTO" in a plurality of times. In other words, a plurality of entries "I-5/SACRAMENTO" consecutively in the guidance list is redundant and even confusing. Thus, there is a need of a new display method and apparatus to solve this problem by providing a simple and more intuitive manner of showing a route guidance list.

SUMMARY OF THE INVENTION

It is, therefore, an object of the present invention to provide a display method and apparatus for a navigation system which is capable of displaying a simplified and easily understandable route guidance list which lists road names on a calculated route to the destination with respect to roads that intersect with the calculated route.

It is another object of the present invention to provide a display method and apparatus for a navigation system which is capable of combining the two or more same road names on the calculated route into one name in the route guidance list so that the user is not confused by the repetition of the same road names.

It is a further object of the present invention to provide a display method and apparatus for a navigation system which is capable of displaying the two or more same road names that are broken down from the one combined name upon request by the user.

One aspect of the present invention is a display method for a navigation system to display a simplified route guidance list on a monitor screen. The method includes the steps of: calculating a route to a destination specified by a user for performing a route guidance operation to the destination, retrieving information on intersecting roads that intersect with the calculated route, and displaying a route guidance list which lists road names on which the calculated route is established and a distance associated with the intersecting road. The route guidance list shows one integrated road name if there are two or more identical road names consecutively on the calculated route and an overall distance that is a sum of all the distances associated with the intersecting roads of the identical road names that intersect with the calculated route.

The display method further includes a step of changing the route guidance list to show a list of the identical road names that are broken down from the integrated road name. Alternatively, the display method further includes a step of changing the route guidance list to show a list of the identical road names that are broken down from the integrated road name or changing back the route guidance list to show the integrated road name.

In the display method, the step of changing the route guidance list from the one showing the broken down road names to the one showing the integrated name is conducted by operating a switch on the navigation system. Alternatively, in the display method, the step of changing the route guidance list between the one showing the broken down road names and the one showing the integrated name is conducted by operating a switch on the navigation system.

The display method further includes a step of displaying an indicator showing that a road name indicated in the route guidance list is the integrated road name of two or more identical road names. In the display method of the present invention, the route guidance list that shows the broken down road names also shows the integrated road name at a top of the broken down road names.

In the display method, information regarding the broken down road names are indented with respect to information regarding other entries in the route guidance list, thereby distinguishing the information on the broken down road names from that of the other entries. Further, in the display method, information regarding the broken down road names are expressed by different font or size with respect to information regarding other entries in the route guidance list, thereby distinguishing the information on the broken down road names from that of the other entries.

Another aspect of the present invention is a display apparatus for a navigation system to simplify the route guidance list on a monitor screen by implementing the various steps of the display method described above. The display apparatus of the present invention enables to simplify the route guidance list so that the route guidance list allows the user to quickly grasp the important information thereon at a glance.

According to the present invention, the navigation system enables to simplify the information in a route guidance list. The navigation system displays the route guidance list on the monitor screen in an intuitive and organized manner to show the user various roads that encounter during the trip to the destination. In the case where the same road name on the calculated route arises consecutively two or more times in the conventional method, the guidance list of the present invention integrates them into one. The navigation system also allows the user to select to see the detailed, i.e, broken down entries for the integrated entry. Thus, the route guidance list of the present invention is able to provide the information on intersecting roads on the calculated route to the destination in a manner that the user can easily understand the information at a glance on the monitor screen, which also promotes the safe driving.

BRIEF DESCRIPTION OF THE DRAWINGS

FIGS. 4A-4D are schematic diagrams showing examples of route guidance list on the navigation system of the present invention in the situation of FIG. 2, where

DETAILED DESCRIPTION OF THE PREFERRED EMBODIMENT

The method and apparatus for displaying a route guidance list of the present invention is explained in detail with reference to the accompanying drawings. In the present invention, the navigation system displays a route guidance list on the monitor screen in an intuitive and organized manner to show the user various roads that encounter during the trip to the destination. In the case where the same road name that intersects with the calculated route arises two or more times in the conventional method, the guidance list of the present invention either combines them into one or arranging them in a specific way to be easily conceivable for the user.

Thus, the route guidance list of the present invention is able to provide the information on intersecting roads on the calculated route to the destination in a manner that the user can easily understand the information at a glance on the monitor screen. It should be noted that the description will be made where the route guidance method and apparatus is applied to a vehicle navigation system, but the method and apparatus under the present invention for displaying the route guidance list can be implemented to other devices, such as portable devices, personal computers, cellular phones, etc.

FIGS. 4A-4D are schematic diagrams showing examples of route guidance list on the navigation system of the present invention in the situation of FIG. 2. In the guidance list of FIGS. 4A-4D, each entry has a distance indicator 83, a maneuver icon 81, and a road (street) name indicator 85. The distance indicator 83 shows the distance on the calculated route between the two roads that intersect with the calculated route indicated by the road name indicator 85. The distance on the distance indicator 83 can also be a length between the current vehicle position and the next road that intersects with the calculated route. The maneuver icon 81 provides information about maneuvering operation or direction, such as going straight, making a left turn, branching off to the right, etc. The road name indicator 85 shows a name of road on which the calculated route to the destination is established.

Figure 4A:
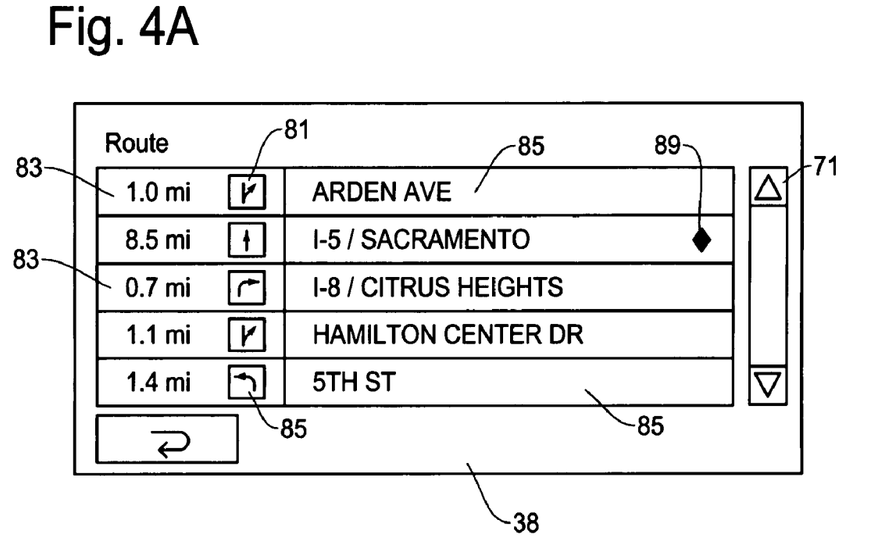
FIG. 4A shows a route guidance list in which a plurality of same entries are integrated into one entry.

FIG. 4A shows an example of route guidance list in which a plurality of the same entries (road names) are integrated as one entry. Specifically, "I-5/SACRAMENTO" that is listed three times consecutively in the example of FIG. 3 is now integrated into one entry. As noted above with reference to FIGS. 2 and 3, the interstate highway "I-5/SACRAMENTO" establishes at least a part of the calculated route to the destination.

In the screen example of FIGS. 4A-4D, a mark (switch, key) 89 is provided to indicate whether a particular entry in the route guidance list is a group of entries or a single entry. In FIG. 4A, since the entry "I-5/SACRAMENTO" is a group of the same entries, the mark 89 is highlighted. Although mark 89 with a diamond shape is used to indicate that the entry is a composite of a plurality of entries, other indicator may be used in place of the diamond mark 89 for the same purpose. For example, different font, color, flickering, etc. may also be used for indicating that a particular entry is an integrated one.

Figure 4B:
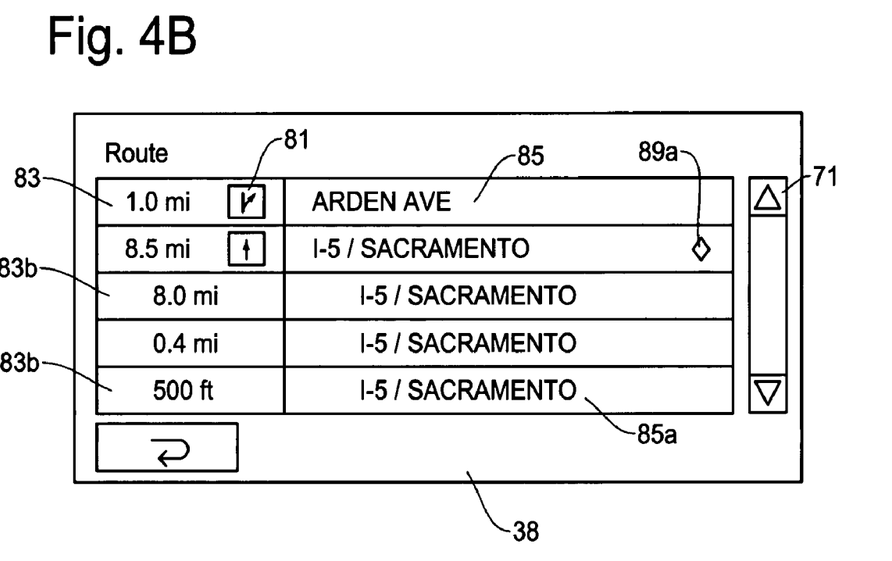
FIG. 4B shows a route guidance list in which the one entry of FIG. 4A is broken down to a plurality of entries.
Figure 4C:
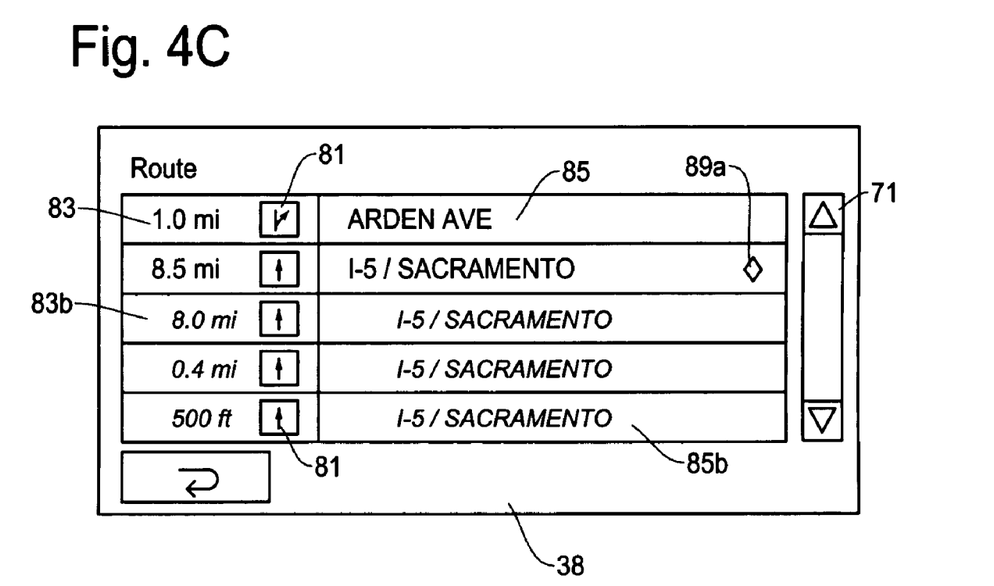
FIGS. 4C-4D show modified versions of FIG. 4B where the broken down entries have different fonts, size, etc.
Figure 4D:
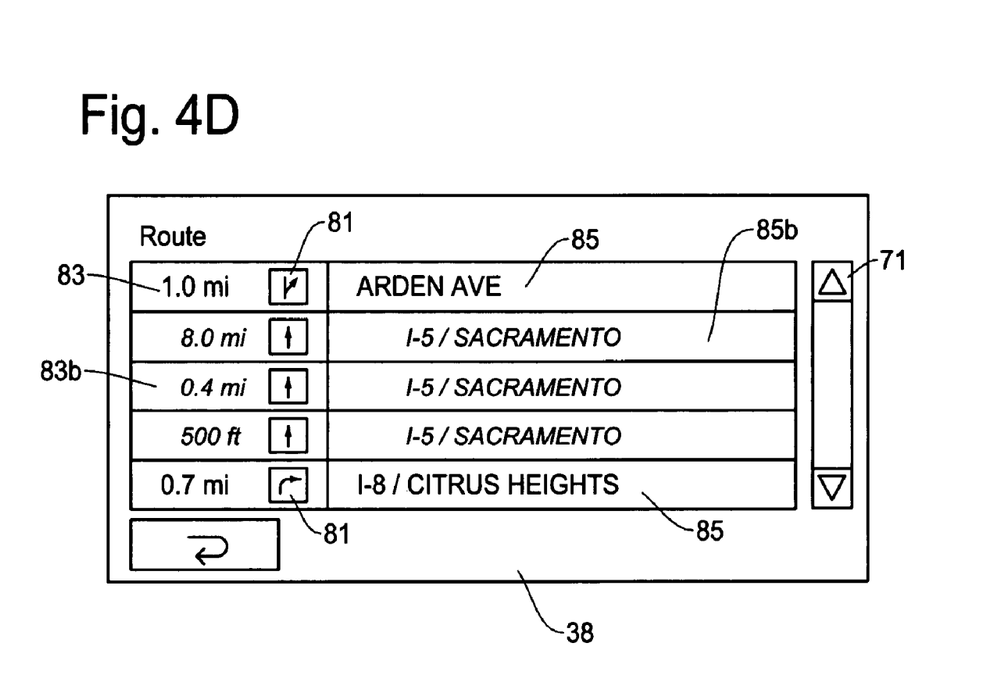

In the route guidance list of the present invention, it is also possible to break down all the entries that are combined or integrated into the one entry in the manner noted above. Such an example is shown in FIGS. 4B-4D in which the same road name is repeatedly listed by the name indicators 85 in the route guidance list. Typically, such broken down entries will be displayed when the user activates the mark 89 on the screen, although other button or key, or voice commands can also be used.

FIG. 4B shows a route guidance display under the present invention where the plurality of entries that have been combined into one entry in FIG. 4A are now separately displayed (broken down) in the guidance list. In this example, the texts in the name indicators 85a and the distance indicators 83a for the broken-down entries are indented to distinguish those entries from the rest of the entries. The texts for the broken down entries may also be expressed by characters of different size. The color of the mark (switch, button, key, etc.) 89a is changed from the previous color to other color or manner to indicate that the integrated entry has been expanded (broken down). The user may integrate the broken down entries into one entry to be displayed in the manner of FIG. 4A by pressing the mark (switch) 89a again.

Although this display example shows either the integrated entry or its broken down entries, it is also possible to list only broken down entries while eliminating the integrated entry. It is also possible to list only the integrated entry while eliminating the broken down entries. Moreover, as an alternative display example, the broken down entries may be differentiated from other entries by shading, flickering, highlighting, changing colors, beeping, or changing fonts, size, etc.

FIGS. 4C and 4D are alternative display examples where the broken down entries have different font and size from the rest of the entries to facilitate easy recognition by the user. For example, the broken down entries in the list are written in Italic font while the other entries are written in Arial font. Also in FIGS. 4C and 4D, the texts of the broken down entries are indented to be easily distinguishable from the other entries.

In the example of FIG. 4C, both the integrated entry and its broken down entries are included in the route guidance list. That is, integrated entry shows that the user will drive about a distance of 8.5 miles on interstate highway "I-5/SACRAMENTO", and this drive distance is composed of three segments of the "I-5/SACRAMENT" each having the driving distance as indicated by 8.0 miles, 04 miles, and 500 feet, respectively. In the display example of FIG. 4D, the integrated entry shown in FIG. 4C is omitted so that only the broken down entries are shown in the route guidance list.

Figure 5:
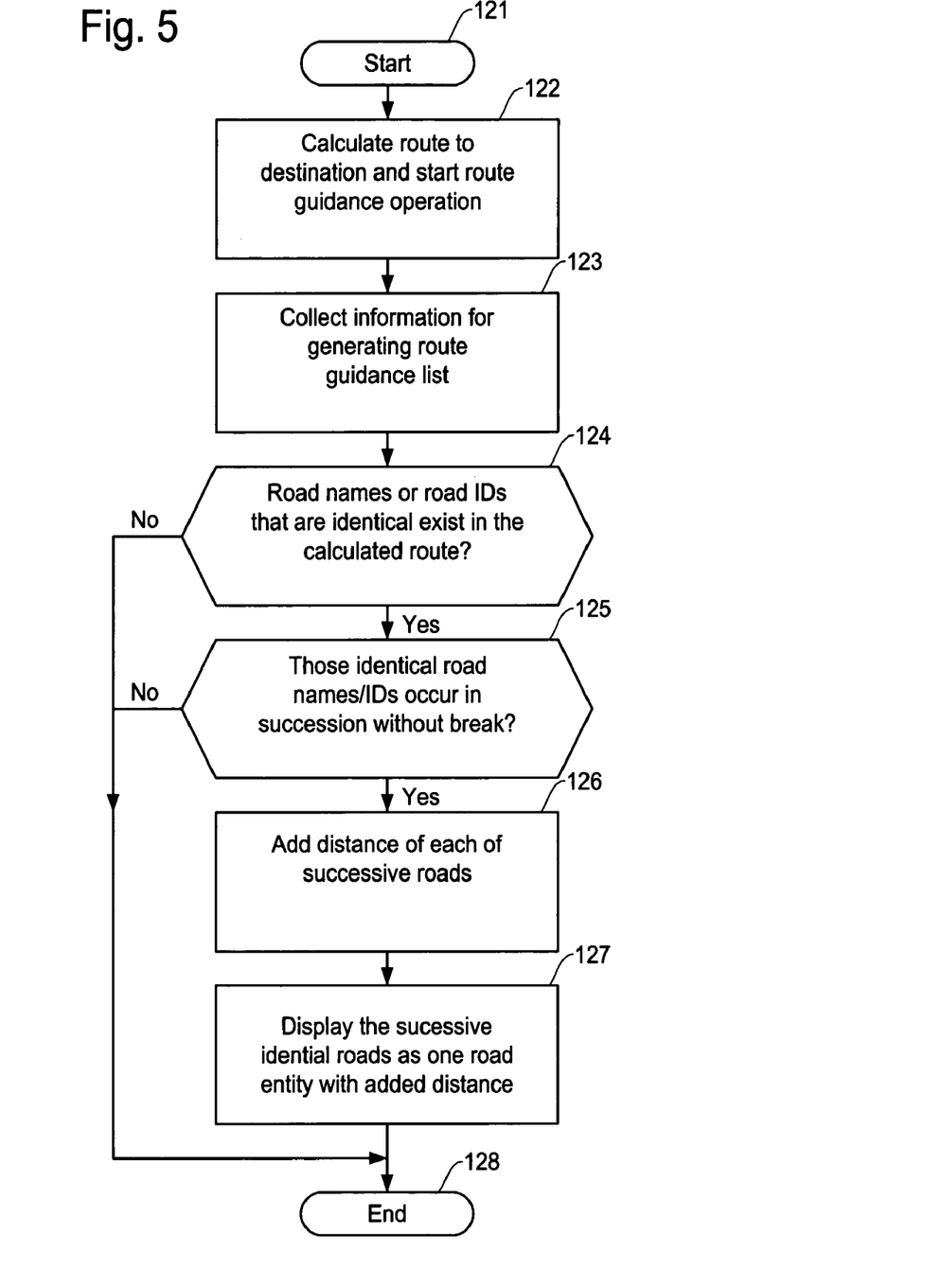
FIG. 5 is a flow chart that illustrates an example of overall operation for displaying the route guidance list under the present invention.

FIG. 5 is a flow chart that illustrates the overall process for displaying the route guidance list under the present invention. When the process begins at the step 121, the navigation system calculates a route to the destination and starts a route guidance operation in the step 122. During the route guidance operation, the navigation system retrieves the map information associated with the calculated route to the destination to produce a route guidance list of the present invention at the step 123.

Then, in the step 124, the navigation system determines whether the road names or road IDs that are identical to one another exists on the calculated route. For example, the road name, such as "I-5/SACRAMENTO" or "I-80/CITRUS HEIGHTS" is used by the navigation system to recognize whether identical entries are associated with the calculated route. The road ID may not be directly related to an actual name of the road and used for a processing purpose, but will be converted to an actual road name when it is displayed.

If it is determined that identical road names or road IDs exist for the calculated route in the step 124, the navigation system then determines whether the road names or the road IDs occur consecutively in the step 125. This step is to find out the situation where the same road name continuously repeats in the route guidance list without including other road name in between as shown in FIG. 3. In other words, the navigation system detects if there are any redundant entries that are better represented by one entry in the guidance list.

If the navigation system finds the two or more same road names (road segments) that occur in succession, the navigation system adds the distance of each road segment to obtain an overall distance of all of the same road names in the step 126. In the example shown in FIG. 2, the distances of 8.0 miles, 0.4 miles, and 500 feet for the road name "I-5/SACRAMENTO" are added to obtain the approximate total distance for the combined road segments.

As shown in FIGS. 4A-4D, the route guidance list of the present invention may include the mark (switch, key, etc.) 89 which indicates that a particular road (entry) is a group of two or more road entries. As a result, the navigation system is able to display the simpler and clutter-free display that helps the user to easily understand the essential information on the calculated route. Finally, after displaying the route guidance list according to the manner described above in the step 127, the process ends in the step 128.

In the description above, the navigation system combines the consecutive identical road names after the route to the destination has been calculated. Typically, the route guidance list changes with the change of the current vehicle position by renewing the map data along the calculated route. However, those skilled in the art will appreciate that the guidance list under the present invention may also combine the consecutive identical road elements during the calculation of the route before completing the calculation for the entire route.

Figure 6:
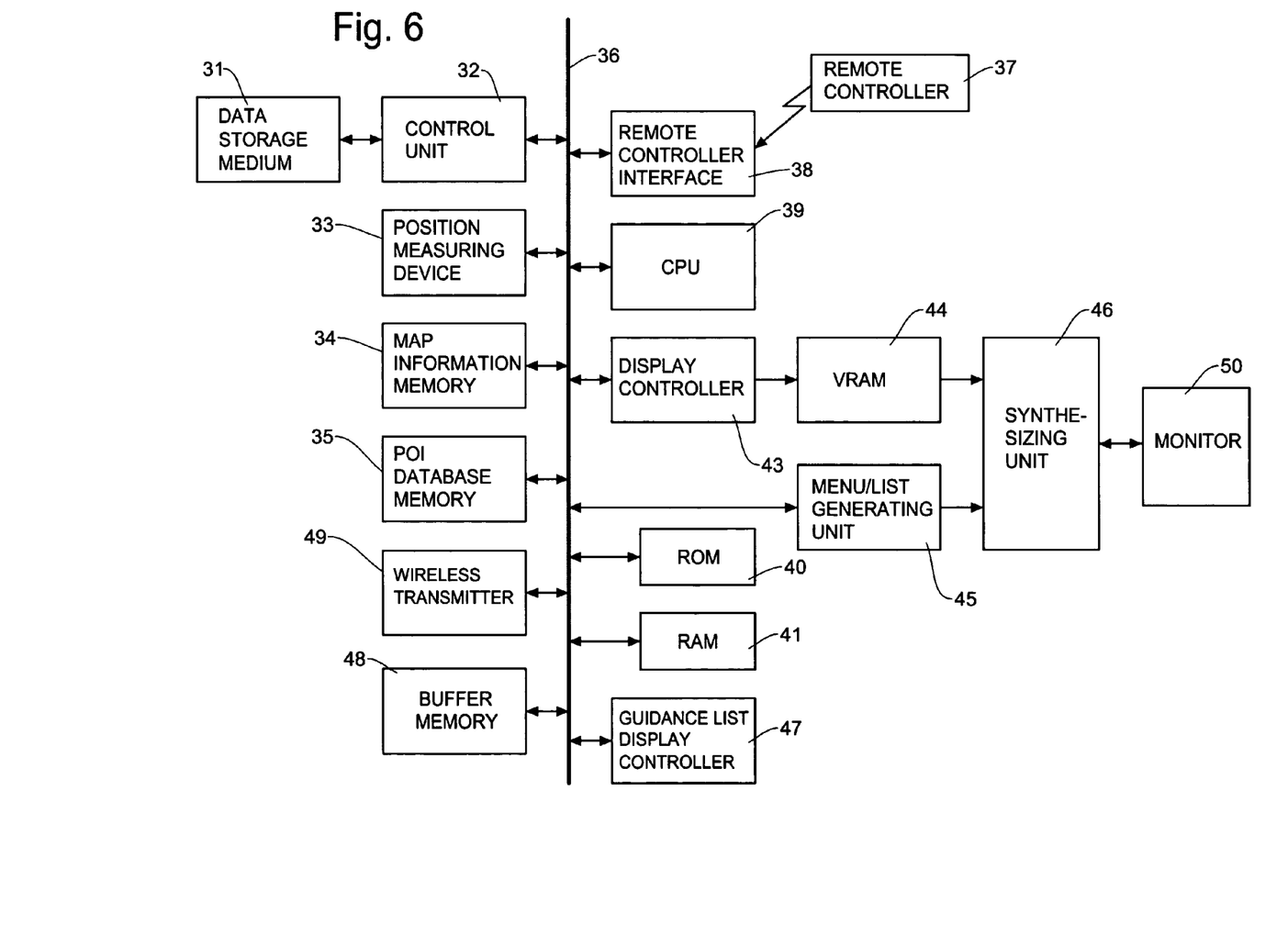
FIG. 6 is a block diagram showing an example of configuration of a vehicle navigation system implementing the guidance list display method of the present invention.

FIG. 6 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from satellites for determining the position, and etc.

The block diagram of FIG. 6 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 6, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a guidance list display controller 47, a buffer memory 48 for temporally storing data for ease of data processing, a wireless transmitter 49 for wireless communication to retrieve data from a remote server, and a monitor (display) 50.

The ROM 40 stores a program that performs the operation described with reference to the flow chart of FIG. 5, which is executed by the guidance list display controller 47. The guidance list display controller 47 can be a part of the CPU 39 or a separate processor. The guidance list display controller 47 combines the identical entries into one integrated entry and instructs the display controller 43 to display the route guidance list. The guidance list display controller 47 also breaks down the integrated entry to a plurality of entries and instructs the display controller 43 to display the broken down entries automatically or in response to the user's request.

As has been described above, according to the present invention, the navigation system enables to simplify the information in a route guidance list. The navigation system displays the route guidance list on the monitor screen in an intuitive and organized manner to show the user various roads that encounter during the trip to the destination. In the case where the same road name on the calculated route arises consecutively two or more times in the conventional method, the guidance list of the present invention integrates them into one. The navigation system also allows the user to select to see the detailed, i.e, broken down entries for the integrated entry. Thus, the route guidance list of the present invention is able to provide the information on intersecting roads on the calculated route to the destination in a manner that the user can easily understand the information at a glance on the monitor screen, which also promotes the safe driving.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
    calculating a route to a destination specified by a user for performing a route guidance operation to the destination;
    retrieving information on intersecting roads that intersect with the calculated route; and
    displaying a route guidance list which lists road names on which the calculated route is established and a distance and a maneuver indicator informing a maneuvering direction associated with the intersecting road;
    wherein the route guidance list shows one integrated road name if there are two or more identical road names consecutively on the calculated route and an overall distance that is a sum of all the distances associated with the intersecting roads of the identical road names that intersect with the calculated route.

2. A display method for a navigation system as defined in claim 1, further comprising a step of changing the route guidance list to show a list of the identical road names that are broken down from the integrated road name.

3. A display method for a navigation system as defined in claim 2, wherein said step of changing the route guidance list from the one showing the broken down road names to the one showing the integrated name is conducted by operating a switch on the navigation system.

4. A display method for a navigation system as defined in claim 2, further comprising a step of displaying an indicator showing that a road name indicated in the route guidance list is the integrated road name of two or more identical road names.

5. A display method for a navigation system as defined in claim 2, wherein the route guidance list that shows the broken down road names also shows the integrated road name at a top of the broken down road names.

6. A display method for a navigation system as defined in claim 2, wherein information regarding the broken down road names are indented with respect to information regarding other entries in the route guidance list, thereby distinguishing the information on the broken down road names from that of the other entries.

7. A display method for a navigation system as defined in claim 2, wherein information regarding the broken down road names are expressed by different font or size with respect to information regarding other entries in the route guidance list, thereby distinguishing the information on the broken down road names from that of the other entries.

8. A display method for a navigation system as defined in claim 1, further comprising a step of changing the route guidance list to show a list of the identical road names that are broken down from the integrated road name or changing back the route guidance list to show the integrated road name.

9. A display method for a navigation system as defined in claim 8, wherein said step of changing the route guidance list between the one showing the broken down road names and the one showing the integrated name is conducted by operating a switch on the navigation system.

10. A display method for a navigation system as defined in claim 8, further comprising a step of displaying an indicator showing that a road name indicated in the route guidance list is the integrated road name of two or more identical road names.

11. A display apparatus for a navigation system, comprising:
- means for calculating a route to a destination specified by a user for performing a route guidance operation to the destination;
- means for retrieving information on intersecting roads that intersect with the calculated route; and
- means for displaying a route guidance list which lists road names on which the calculated route is established and a distance and a maneuver indicator informing a maneuvering direction associated with the intersecting road;
- wherein the route guidance list shows one integrated road name if there are two or more identical road names consecutively on the calculated route and an overall distance that is a sum of all the distances associated with the intersecting roads of the identical road names that intersect with the calculated route.

12. A display apparatus for a navigation system as defined in claim 11, further comprising means for changing the route guidance list to show a list of the identical road names that are broken down from the integrated road name.

13. A display apparatus for a navigation system as defined in claim 12, wherein said means for changing the route guidance list from the one showing the broken down road names to the one showing the integrated name is conducted by operating a switch on the navigation system.

14. A display apparatus for a navigation system as defined in claim 12, further comprising means for displaying an indicator showing that a road name indicated in the route guidance list is the integrated road name of two or more identical road names.

15. A display apparatus for a navigation system as defined in claim 12, wherein the route guidance list that shows the broken down road names also shows the integrated road name at a top of the broken down road names.

16. A display apparatus for a navigation system as defined in claim 12, wherein information regarding the broken down road names are indented with respect to information regarding other entries in the route guidance list, thereby distinguishing the information on the broken down road names from that of the other entries.

17. A display apparatus for a navigation system as defined in claim 12, wherein information regarding the broken down road names are expressed by different font or size with respect to information regarding other entries in the route guidance list, thereby distinguishing the information on the broken down road names from that of the other entries.

18. A display apparatus for a navigation system as defined in claim 11, further comprising means for changing the route guidance list to show a list of the identical road names that are broken down from the integrated road name or changing back the route guidance list to show the integrated road name.

19. A display apparatus for a navigation system as defined in claim 18, wherein said means for changing the route guidance list between the one showing the broken down road names and the one showing the integrated name is conducted by operating a switch on the navigation system.

20. A display apparatus for a navigation system as defined in claim 18, further comprising means for displaying an indicator showing that a road name indicated in the route guidance list is the integrated road name of two or more identical road names.

* * * * *